(12) United States Patent
Harris

(10) Patent No.: US 8,155,697 B2
(45) Date of Patent: Apr. 10, 2012

(54) USB STACKING DEVICES AND APPLICATIONS

(76) Inventor: Scott C Harris, Rancho Santa Fe, CA (US)

( * ) Notice: Subject to any disclaimer, the term of this patent is extended or adjusted under 35 U.S.C. 154(b) by 1029 days.

(21) Appl. No.: 11/956,338

(22) Filed: Dec. 14, 2007

(65) Prior Publication Data

US 2009/0156252 A1    Jun. 18, 2009

(51) Int. Cl.
*H04M 1/00* (2006.01)
(52) U.S. Cl. ..................... 455/556.1; 455/573
(58) Field of Classification Search ............... 455/556.1, 455/556.2, 557, 573, 550.1
See application file for complete search history.

(56) References Cited

U.S. PATENT DOCUMENTS

| | | | | |
|---|---|---|---|---|
| 6,941,114 B1* | 9/2005 | Kuo et al. | ............ | 455/74 |
| 7,149,544 B2* | 12/2006 | Kuehnel et al. | ............ | 455/557 |
| 7,751,183 B2* | 7/2010 | Harris | ............ | 361/679.41 |
| 2006/0007151 A1* | 1/2006 | Ram | ............ | 345/163 |
| 2006/0089171 A1* | 4/2006 | Yoo et al. | ............ | 455/557 |
| 2006/0129736 A1* | 6/2006 | Kuehnel et al. | ............ | 710/313 |
| 2006/0208066 A1* | 9/2006 | Finn et al. | ............ | 235/380 |
| 2006/0253894 A1* | 11/2006 | Bookman et al. | ............ | 726/2 |
| 2008/0052439 A1* | 2/2008 | Young et al. | ............ | 710/305 |
| 2008/0150486 A1* | 6/2008 | Kuan-Ting et al. | ............ | 320/128 |
| 2009/0019224 A1* | 1/2009 | Pocrass | ............ | 711/115 |

* cited by examiner

*Primary Examiner* — Lewis West
(74) *Attorney, Agent, or Firm* — Law Office of Scott C. Harris, Inc.

(57) ABSTRACT

A modular device formed with USB connectors. The USB can be used for connecting different kinds of devices, for example memories, user interfaces and the like. The USB devices can be piggybacked. In an embodiment, the USB devices can be located in a cavity formed inside the computer. Another embodiment forms a modular cellular telephone.

12 Claims, 2 Drawing Sheets

USB STACKING DEVICES AND APPLICATIONS

BACKGROUND

Removable electronics such as memory devices are commonly used as part of an electronic device. For example, devices such as computers, cameras, and other devices often use removable memory cards. The memory cards may be in different formats.

USB memory cards are known which include nonvolatile solid-state memory therein. However, other forms of memories may include different form factors, connector styles etc, making those other memories in essence incompatible with USB devices.

For example, Sony markets a memory that they call the memory stick. Other companies use SD memory, Compact Flash memory or others. In many cases, a smart card is also a form of memory that stores a memory therein. Some removable devices, such as smart cards or USB devices, in fact use a processor as part of the device.

When the removable device is put into a slot in the device, it fills the slot. Moreover, when you have a device that requires one kind of memory, you must buy that kind of memory to use in the device. However, USB memory has become ubiquitous since virtually all computers come with a USB slot. The USB memory is often intended to be removable and transportable.

SUMMARY

The present application describes an improved packaging and architecture for a USB memory device.

One embodiment discloses a stackable USB device that can be placed into an indented part within a computer system so that at least part of the device is maintained within the housing, e.g., 80% or more.

Another aspect describes that the USB device or similar device plugs into a port, but also has a piggyback port connector. That connector may be the same sex and format that it plugs into. This allows multiple devices to be plugged in to the single port. For example, a hub/extender may be used for this purpose.

Another embodiment describes a USB device that forms a modular part of a cellular telephone.

Yet another aspect describes the use of a USB device as a semipermanently installed memory within a device of a type that conventionally includes such memory.

DETAILED DESCRIPTION

Figure 1:
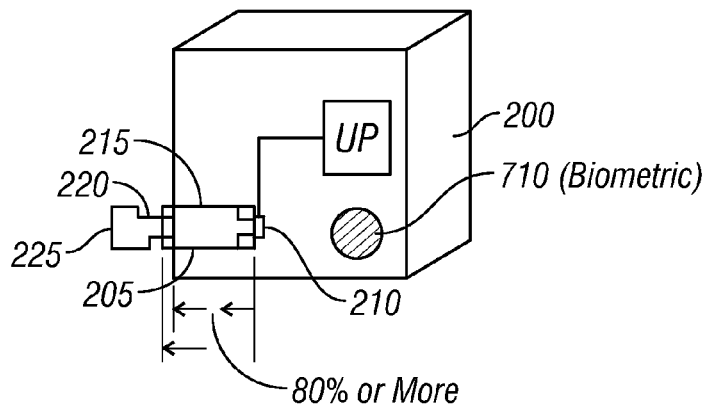
FIG. 1 shows an embodiment with a USB stick installed within a computer housing.

FIG. 1 illustrates an embodiment in which a computer system, which can be a personal computer, or a portable computer device such as a camera includes an indented port portion forming a cavity 205 with inner surfaces therein. In this embodiment, the cavity portion 205 includes a USB connection 210 at the bottom portion of the cavity. A USB device 215 fits in the cavity and connects to the USB connection 210.

The USB device 215 also includes a piggyback port 220 which can plug into another USB memory device 225. The piggyback port may be the opposite sex connector from the connector on the first side, and may be the same sex as the connector 210 at the bottom portion of the cavity.

In an embodiment, the outer dimensions of the USB device 215 are sized relative to the inner surfaces of the cavity to fit snugly within the inner dimensions of the cavity 205.

Preferably the USB device 215 includes an elastomeric or other soft and deformable exterior, that allows it to fit snugly into the cavity 205. For example, the elastomeric exterior may be compressed slightly, e.g., by 0.5 cm, to frictionally hold the device within the cavity.

Figure 2:
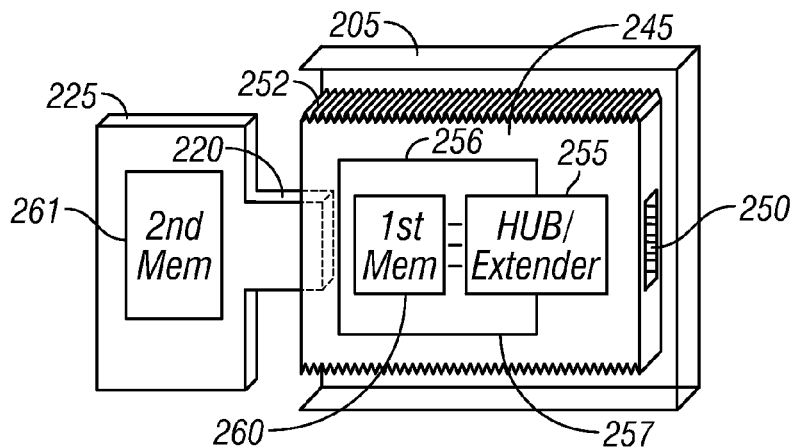
FIG. 2 illustrates a schematic view of an exemplary memory device.

FIG. 2 illustrates a schematic view of the devices, e.g. memories 215, 225. Device 215 includes a USB connector 250 that connects to the corresponding USB connector in the computer 200. The device 215 also includes outer surfaces shown as 252 which are formed of corrugated elastomeric material. These surfaces are sized to have alternate portions—some that press against the inner surface of the cavity 205 and other portions that do not press against the inner surface of the cavity 205. The power and signal from the USB connector 250 is connected to a USB hub and extender 255 that produces additional USB outputs. It also provides power on the lines 256, 257. These power output and signal lines are coupled to the piggyback connector 220. The second device 225 is shown connected to the piggyback connector 220. In This embodiment, the piggyback connector may be the same type and sex as the connector 250, within the cavity 205, and to which the device connects.

The second device 225 may also have a hub and/or extender, or may simply include a memory connected to the USB. The first device 215 includes a first electronic part 260 therein. The second device 225 includes a second electronic part 261 therein. The second device may have a memory size and type that is different than the memory in the first device. In one embodiment, the first electronic part 260 is a smart card or identification or encryption device, that is usable to read or decode or take some other action on the second device 261. The smart card in one unit, therefore, can decrypt information in the other unit.

This also facilitates use of multiple memories or multiple units connected to a single port. In addition, since smaller memory chips are often less expensive than the larger memory chips, it may often be more economically feasible to use two small chips instead of one large chip. The piggyback arrangement allows multiple connections to a single USB port by "stacking" the USB devices.

This embodiment also provides the additional advantage that a device once inserted no longer substantially extends beyond the outer form factor of the computer, e.g., where 80% of the length of the length of the inserted device is inside the cavity within the computer. This may provide a more attractive form factor, and better protection against unintentional damage to the device, for example.

Figure 3:
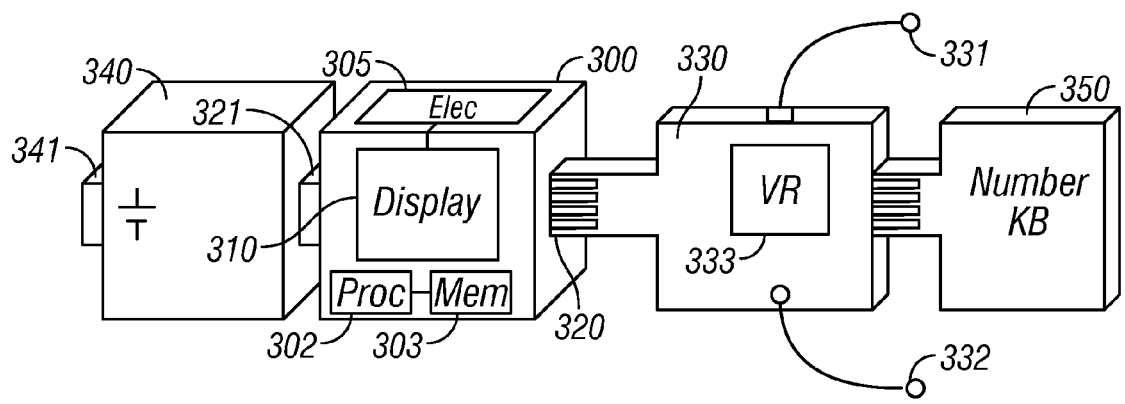
FIG. 3 illustrates a modular cellular telephone embodiment.

Another embodiment, illustrated in FIG. 3, uses a stackable USB device to form a modular, portable communication device such as a cellular telephone. In this embodiment, the stackable USB device is itself modular because the connections may connect to many different peripherals that are usable with the basic phone system.

A basic device includes a phone module 300 which includes telephone electronics module 305, connected to a peripheral device here a display 310. The device 300 may include at least one clear portion of housing so that the display 310 can be seen through the clear housing. The telephone electronics may include a conventional CMDA and/or GSM transceiver, and other electronics found in a portable telephone, including a processor 302 with memory 303 that stores information for the operation of the portable phone.

The processor 302 and memory 303 may store information defining a plug and play environment, e.g., information about how to communicate with different peripherals. This allows automatic recognition of different attached peripherals, as described herein.

The package 300 includes two different USB connections, here both female USB connections 320, 321. In this embodiment, all the modules have male connections to connect with the connections 320, 321, and either of the connections may receive any of a number of different modules.

A communication module 330 includes an earpiece 331 and a microphone 332. The module 330 may also include a voice recognition module 333 to enable voice enabled dialing. This device is connected to the USB port to communicate to the telephone electronics 305, to enable dialing and communication using this module 330. Operations are mirror on the display 310.

Different modules are described herein. Module 340 may include a battery that powers the telephone module 300. This is connected to the USB connector 320 on the telephone package 300, but can alternatively be connected to the other connector 320.

In an embodiment, the telephone can thus be formed using connectable and interchangeable parts. The batteries such as 340 use standard connectors (here USB), and can be interchanged. In addition, other devices can be piggybacked on the modules—for example, battery 340 is shown with a piggyback connector 341 that allows connection of any other module to the piggyback connection.

The embodiment shows a handset/earpiece/mouthpiece unit 330; however it should be understood that other modular devices such as a numeric keyboard, or a Bluetooth or other wireless module such as Wifi or Wimax, or hotspot adapter can alternatively be attached.

This also enables a new way of connecting to public or private networks such as hotspots. Currently, one must log in to the hotspot, and follow login and payment procedures that allow use of the hotspot. This can sometimes be difficult and time consuming, especially for inexperienced users. This may serve as a deterrent to using the pay internet area. One of the deterrents is because of the time necessary to access the area. For example, a user who has only 30 minutes to use in internet access will not find it feasible to spend 10 of those minutes connecting to the pay internet site.

This embodiment allows a prepaid hotspot adapter to be sold, e.g. with an hour of hotspot time on it, and preconfigured for use with the specific hotspot provider, e.g, having a smartcard therein with identification information that allows access of the area. This may include communication chips for use with the hotspot provider, for example, or just communication parameters for use with the hotspot provider. The units may be returnable and/or rechargeable so that the reusable parts of the chips can be re-used. In one embodiment, the USB device can be connected to the internet, or to a kiosk to recharge the chips. Alternatively, the device can just be exchanged for another device.

Importantly, all parameters needed to log in to the pay internet area are all programmed into the device so that the user does not need to carry out difficult and time consuming steps to log in to the pay area.

An advantage of this system is completely unexpected. This enables using a completely configurable and modular portable device such as a telephone. The telephone uses standard connectors, here USB connectors, to allow different peripherals to be connected. The attached parts may be plug and play so that new parts can be added and automatically configured for use with the portable telephone. The telephone may automatically recognize new parts, and communicate therewith using information from the plug and play information stored in memory 303. Also, the plug and play in memory 303 may be automatically updated when the phone module 300 is connected to the communication network.

This also enables the user to take the basic communication part of the telephone 300, and configure it to include only those parts they believe they will need. They can use a battery module 340, or alternatively could connect the communication part directly to AC power. They can use a keyboard, or use some other kind of user interface such as a voice recognition module. This can also be connected to enable various kinds of communication, for example other modules could include television modules, Internet modules, or the like.

Different sizes of batteries could be used. Take the example, therefore, where a user can decides to go to the grocery store. They may need a telephone to take with them, but desire only very limited functionality. Therefore, the user could connect a small battery, and the limited functionality unit 330, allowing them to carry a small sized device. Alternatively, if they need to make calls, in addition to or in place of the limited functionality device 330, they may configure the device to include a module 350 that has a numeric and/or alphanumeric keyboard 350. They may also install a larger battery or piggyback another battery on to the expansion slot 341. In addition, a Bluetooth module can be installed, in which case no earpiece, mouthpiece is necessary at all. The user can reconfigure the modules and parts as desired to provide a phone having the desired characteristics. A user can decide which modules to install, depending on their desired use.

Figure 4:
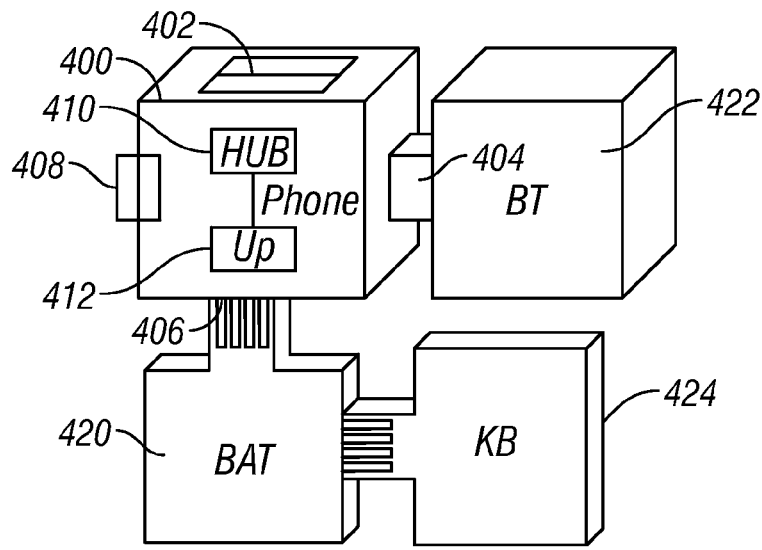
FIG. 4 illustrates an embodiment that can be reconnected in two directions.

FIG. 4 shows an alternative embodiment in which the device is configured in a way that allows each of the different modules to be connected in two different dimensions/directions. In this embodiment, the phone module 400 includes connections on four different sides shown as 402, 404, 406 and 408. Each of these can be USB connections, and can be powered by an internal hub 410 that connects to the phone microprocessor 412. The devices can be connected in two different directions, for example a battery 420 is shown connected to the bottom of the module 400, a Bluetooth module 422 is shown connected to the side of the module, and a keyboard 424 shown piggybacked on the battery module.

Moreover, the battery or other module can be installed within a cavity within the basic telephone device 300, as in the first embodiment, so that parts do not stick out of the device or only stick out by less than 20%.

In a two dimensional version, therefore, 4 different spots for external connections can be connected to the basic phone unit. The units can be piggybacked, so allow other devices to be added.

Figure 5:
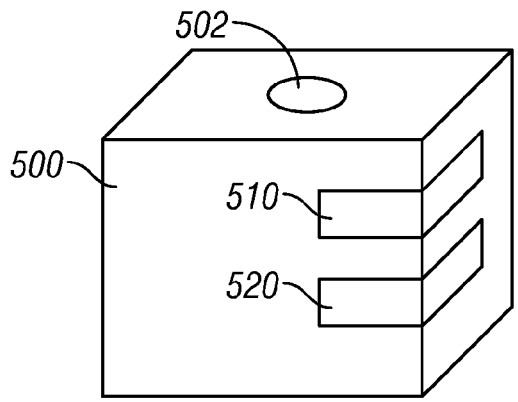
FIG. 5 illustrates embodiments used in a portable device such as a camera.

Another embodiment shown with respect to FIG. 5 uses a USB type device in a camera or telephone which previously has required proprietary memory formats such as SD memory. For example, in this embodiment, there may be two indented cavity portions that are similar to the cavity portions shown in FIG. 1. The device 500 is shown as a camera with a lens 502, however it should be understood that this can be any portable device that requires memory. In the embodiment, the first cavity 510 receives a first part that may be a USB memory. The second cavity 520 receives the second part that may be a battery. Both the memory and the battery have at least one aspect of the same form factor, for example the same width, that allows many different devices of this same form factor to fit within the cavity.

Figure 6:
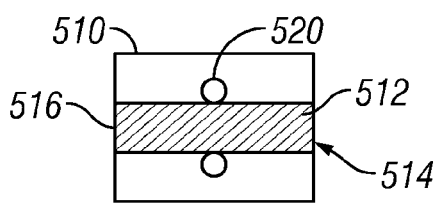
FIG. 6 illustrates tool removal.

In FIG. 5, for example, the cavity shown as 510 may have a device such as 512 that presses against the sides 514, 516, to hold the device in place. In addition, FIG. 6 shows how the electronic device may have a spot for example for tools such as 520, which enables tools to be attached to the device to remove the device if it is too snugly inserted.

Figure 7:
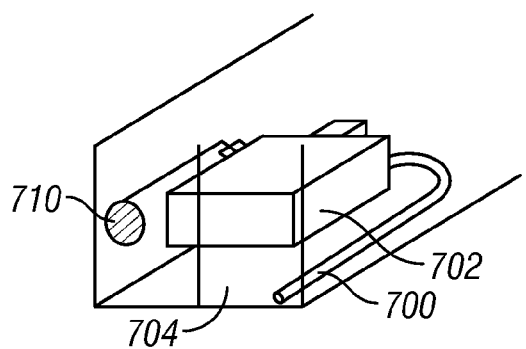
FIG. 7 illustrates lever based removal.

Another embodiment, shown in FIG. 7 uses a release mechanism shown as 700, where the release mechanism pushrod can mechanically push the electronic device 702 out of its cavity 704. Another embodiment may use an electro-mechanical actuator to push the device 702 out of the slot, and may lock the device 702 into the cavity 700 at other times. In another embodiment, a biometric reader 710 may be provided to read a biometric identification from a user. If the read biometric matches with a stored biometric, then the device is extracted. Otherwise, the device 702 remains locked into place. This allows a user to insert their device that may have personal information, and be assured that no one will steal it, since the code is required to access the device.

The above has described use with USB style memories. While this may be considered a preferred embodiment, it should be understood that other kinds of universal connectors can be used, for example FireWire connectors, or any other form. The memories use may be USB 1, USB 2, or USB 3, or any future generation of USB. It is preferred that the cards be ubiquitous and of a form factor that is available on most PCs, to enable ready acceptance.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other case sizes and shapes are intended to be encompassed. Other kinds of communicators beyond cell phones and blackberry type devices are contemplated.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The communicator described herein may include any kind of computer, either general purpose, or some specific purpose computer such as a workstation. The computer may be an Intel (e.g., Pentium or Core 2 duo) or AMD based computer, running Windows XP or Linux, or may be a Macintosh computer.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A telephone, comprising;
   a first housing, having telephone electronics therein which allow communication over a wireless telephone system, said first housing including at least first and second connectors accessible from an outer surface of said first housing, wherein said first and second connectors are connectors of the same type;
   a battery module, having a second housing that is physically separate from said first housing holding said telephone electronics, said battery module having a first battery connector that connected to said first connector of said first housing and said second housing in its entirety being held attached to said first housing when said first battery connector is connected to said first connector of said housing; and
   a user interface module, including a capability to control receiving an entered address to be communicated with using said telephone electronics, said user interface module having a third housing that is physically separate from said first housing, said user interface module connected to said second connector of said first housing, and said second housing in its entirety being held attached to said first housing when said user interface module is attached to said first housing.

2. A telephone as in claim 1, further comprising a second user interface module that includes a wireless connectivity capability of a type of capability that is not obtained from said first housing, or from said battery module, or from said user interface module, and which is substituted for said first user interface module.

3. A telephone as in claim 1, wherein said telephone electronics include a part storing plug and play information for a plurality of telephone peripheral parts that connect to said connectors, and said telephone electronics uses said plug and play information to determine information that allows said telephone electronics to communicate with said modules.

4. The telephone as in claim 1 wherein said telephone electronics includes a display therein, and includes at least a portion of the housing which allows said display to be seen therethrough.

5. A telephone as in claim 1, wherein said battery module includes a second battery connector thereon, and a hub device that controls electronic communication between said first battery connector and said telephone electronics in said first housing, and another part coupled to said second battery connector.

6. A telephone as in claim 1, wherein said surface that is held attached includes holding one housing to another housing using friction on said connectors that connect said one housing to said another housing, where one connector is rigidly extending from said one housing, and another connector is inset in said another housing.

7. A telephone as in claim 1, wherein said first housing includes a communication hub therein, which controls electronic communication between said modules that are connected to said first and second connectors.

8. A telephone as in claim 1, wherein said first and second connectors are on surfaces of said first housing that face orthogonally to one another, and where said battery module and at least one other module face in orthogonal directions.

9. A telephone as in claim 1, wherein one of said housings is held to another of said housings by surfaces of said connector.

10. A battery module comprising:
- a first battery part having a housing, housing the first battery part;
- a first USB connector, connected electrically to said battery part;
- a second USB connector, connected electrically to said battery part; and
- wherein at least one of said USB connectors provides access to the power provided by the first battery part, and wherein both of said first and second USB connectors electronically communicate between said first and second USB connectors,
- wherein said first and second USB connectors comprise surfaces on said housing holding said housing of said first battery part to both first and second other housings when said first battery part is powering circuitry in said other housings,
- wherein a first of said USB connectors is on a first surface of said housing, and a second of said USB connectors is on a second surface of said housing, facing in an orthogonal direction to said first surface, and where said first other housing is held to said housing in a first direction, and said second other housing is held to said housing in a second direction orthogonal to said first direction.

11. A module as in claim 10, further comprising a hub within said first battery part, connectable between said USB connector and another USB connector, said hub carrying out control of electronic communication.

12. A method comprising:
- at a first time, first connecting first and second peripheral devices to a portable communication device, said connecting including holding surfaces of said first and second peripheral devices to a housing of said portable communication device;
- controlling said portable communication device to carry out communication using said first and second peripheral devices, and using said first and second peripheral devices allow first and second functions associated with communication;
- at a second time, different than said first time, second connecting a third peripheral device to said portable communication device, said second connecting including holding surfaces of said third peripheral device to said housing of said portable communication device; and
- using said third peripheral device to allow a third function associated with communication, said third function being different than said first and second functions, wherein said first connecting and said second connecting all connect to a connector that is of the same type, wherein said holding surfaces are surfaces of at least first and second connectors that hold respectively, said first and second peripheral devices to a housing of said portable communication device, wherein said first and second connectors are on surfaces of said first housing that face orthogonally to one another, and where said first and second peripheral devices face in orthogonal directions relative to one another.

* * * * *